Figure 1:
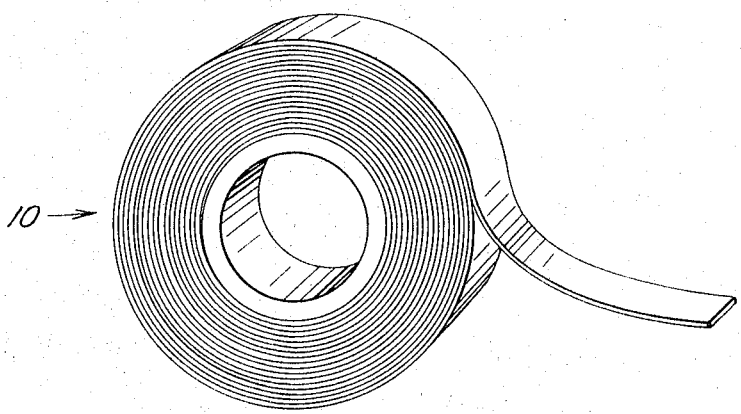

March 7, 1967 H. M. BOND ETAL 3,307,690
OIL RESISTANT NON-CONTAMINATING ADHESIVE TAPES
Filed Dec. 4, 1962

INVENTORS
HERBERT M. BOND
JUN TOMITA

Carpenter, Abbott, Coulter & Kinney
ATTORNEYS

_3,307,690_
OIL RESISTANT NON-CONTAMINATING ADHESIVE TAPES
Herbert M. Bond Stillwater Township, Washington County, and Jun Tomita, St. Paul, Minn., assignors to Minnesota Mining and Manufacturing Company, St. Paul, Minn., a corporation of Delaware
Filed Dec. 4, 1962, Ser. No. 242,158
9 Claims. (Cl. 206—59)

The present invention relates to new and useful pressure sensitive oil resistant and oil-contaminant free adhesive tapes normally wound in roll form. More particularly this invention relates to an oil resistant, contact adherent, non-contaminating tape which sticks well on contact to paper or other surface and which retains its adherence without contamination of oil even when immersed in oils at relatively high temperatures and for long periods.

The new contact adherent tapes of this invention have particular utility in the electrical field, and have unique utility in the winding of transformer coils and the like wherein the tape may be subjected to quite high temperatures in the presence of transformer oils, these new tapes combining excellent hydrocarbon oil resistance and non-contaminability with good adherence.

Prior to this invention, the utilization of adhesive tapes in holding transformer coils in place was not completely practical as the only two kinds of tape available for such use had serious deficiencies. One kind possessed very little oil resistance and readily separated from the kraft paper surrounding the transformer coils and over which the tape was applied to maintain the coils in place. Thus, although this kind of tape did not contaminate the oil, and thereby change the power factor thereof, upon continued contact, the tape did not adequately perform its intended function of holding the coils in place. The other kind of tape available, while it adhered well to the paper in the presence of oils, contaminated the oil.

In accordance with this invention, oil resistant non-contaminating contact adherent tapes are provided which are free from the deficiencies of these prior known tapes.

The non-contaminating oil resistant contact adherent adhesive tapes of this invention are tapes wound in roll form and which have backsides only lightly adherent to and readily separable from the tape adhesive on rapid unwind of the tapes from roll form, each tape comprising a backing having adherent adhesive on the front side thereof. The adhesive on the front side of the tape backing comprises (1) a normally thermoplastic base selected from the group consisting of an acrylate polymer, and an acrylate modified polyvinyl acetate polymer, (2) from about 2 to about 50 parts of a cross-linking agent for each 50 to 100 parts base resin, and (3) a heat-activated cross-linking promoting catalyst, such as an organic peroxide. These ingredients may be blended in a volatile solvent and the resultant adhesive applied to the backing and cured, when necessary, to provide tape having prior to thermosetting a shear strength value of greater than 2 minutes in the case of filament reinforced backed tapes which normally carry adhesive coating weights of greater than about 12 grains/24 square inches (1.5 mils thick), and greater than about 20 minutes in the case of thin film backed (up to about 5 mils) tapes which normally carry adhesive coatings of lesser coating weights, and an adhesion value of at least about 20 ozs. per inch of tape width (both of these values being determined by specific tests subsequently to be described).

Although the use of the new tapes of this invention is highly advantageous in the electrical field, their use is not limited to this field and these tapes are, in fact, of general utility both in environments where resistance to oils, particularly aliphatic oils as are used for most lubricating purposes, and in general purpose areas for mending, making, holding, and for many other purposes outside of the electrical field.

However, to take advantage of the electrical properties of these tapes, the tapes should have extremely low moisture retention so that the electrical insulating properties of the tapes are retained. The tape backings should have less than about 1% moisture retention and both the backing and adhesive should have very low shrinkage with temperature changes, the shrinkage should be less than about 3% at temperatures in the neighborhood of about 125° C. The tapes, to serve as transformer tapes, should adhere on contact to paper surfaces or the like at normal temperatures upon contact therewith and, after thermosetting, maintain adherence to such surfaces without separation therefrom by "popping off," dissolution of the adhesive, or by other causes in the presence of oil at high temperatures (as high as 100° C. and higher). The tapes should be so formed that the tape backing, backsize, and adhesive will not contaminate hydrocarbon oils upon long term exposure to these oils at high temperatures while yet being able to be wound in roll form and unwound from roll form rapidly and without adhesive transfer or destruction of the contact adherability of the tape adhesive. The tapes of the present invention answer all of these requirements.

Among useful backings have been found to be such materials as cellulose acetate films, glass cloth, "Teflon" (when the surface is primed with sodium for receptivity of the adhesive), cotton cloth, oriented polyesters, and the like.

Excellent backings for the formation of transformer tapes have been found to be organic film backings having low moisture absorption under atmospheric conditions which remain strong in thin film form and which withstand temperatures at least as high as about 125° C. without significant loss of properties. A preferred example of this tape backing is an oriented polyester film such as that formed as the polymeric condensation product of terephthalic acid, or its ester, with various glycols, e.g. ethylene glycol, dimethylolcyclohexane.

For high strength tapes, preferred tape backings are filament reinforced backings, as for example the kind set forth in the Tierney Patent No. 2,750,030, particularly continuous glass filament reinforced cellulose acetate films.

In the adhesive formation, for the base polymer, polyvinyl acetate, an alkyl acrylate polymer or an alkyl acrylate-vinyl acetate copolymer containing at least about 10% acrylate, and preferably 10 to about 50% acrylate, may be used. In general, these polymers are somewhat elastic in nature and possess surface tack. Examples of suitable acrylate polymers are copolymers of alkyl acrylates with acrylic acid and with one another, as for example 96:4 (mol ratios) polyisooctyl acrylate-acrylic acid copolymer; 75:25 (mol ratios) methylamyl acrylate and fusel oil acrylate copolymers. Examples of acrylate modified polyvinyl acetate polymers are copolymers of vinyl acetate and 2-ethyl hexylacrylate or n-butyl acrylate, the amount of acrylate modifying comonomer being in the range of from about 10 to about 50% (mol ratio). The alkyl groups of the acrylate modifier for the polyvinyl acetate polymers, and of the acrylate polymers, may be straight or branched chain alkyl groups containing from 4 to 10 carbon atoms, as for example n-butyl, tertiary butyl, n-amyl, n-hexyl, 2-ethylhexyl, isooctyl, n-octyl, etc.

Modifiers such as plasticizers and elastomers may be added to the base polymer to increase adhesion, to make the base polymer softer or firmer, and/or to provide improved strength properties in the adhesive. In general the modifying plasticizers and elastomers contain polar groups which provide compatibility with the polyvinyl acetate or acrylate base resin in addition to providing improved solvent and oil resistance in the cured adhesives. Acrylic elastomers, as for example polyethyl acrylate, polybutyl acrylate 75:25 methyl amyl-fusel oil acrylate copolymers, 95.5:4.5 isooctyl acrylate-acrylic acid copolymers, and urethane elastomers, e.g., 80:20 ethylene-propylene glycol hydroxyl terminated adipate polyester with equimolar amounts of methylene diparaphenylene diisocyanate, adipic acid-butanediol-1,4-hydroxyl terminated polyester modified with methylene diparaphenylene diisocyanate and similar urethane modified polyesters, all have been found to be useful modifiers.

Whether modified or not the base polymer is a normally thermoplastic composition and is an adhesomer, i.e., contact adherent and tacky to the touch.

The organic cross-linking agent may be present in about 2 to about 50 parts and preferably 2 to 30 parts, by weight per 100 parts base resin and may be an unsaturated polyester, unsaturated acrylate material or other material having active cross-linking sites. Among cross-linking agents that have been found to be useful are polyesters such as dipropylene glycol-fumarate polyester, isophthalic-maleic acid-propylene glycol polyester, phthalic acid-fumaric acid-propylene glycol polyester, and butanediol-1,3-dimethacrylate polyester. It is these materials which cross-link the adhesive and cure it to an irreversible thermoset state in which state the adhesives are both solvent and oil resistant.

To facilitate cross-linking, a cross-linking promoting catalyst is included in the final adhesive blend. Preferred catalysts of this group are the peroxide catalysts such as the aromatic diacyl peroxides, for example, benzoyl peroxide, 2,4-dichlorobenzoyl peroxide, etc., the aliphatic diacyl peroxides as for example acetyl peroxide, lauroyl peroxide, etc., aralkyl peroxides such as dicumyl peroxide, etc., and alkyl peroxyesters as for example t-butyl perbenzoate, etc. These may be included in from 0.5 to about 10 parts by weight per 100 parts base polymer.

These peroxides are most conveniently blended into the adhesive mixture dissolved in a solvent such as toluene, except, of course, in those cases where the peroxides are liquid to begin with, such as tertiary-butyl perbenzoate. A preferred catalyst is 2,4-dichlorobenzoyl peroxide as this peroxide is relatively unaffected by air or oxygen in its curing effectiveness.

A number of useful adhesive formulations have been prepared within the general formulation following:

Adhesive formulation

Ingredients: Parts by weight
  Base resin _____ 50 to 100
  Modifier _____ 0 to 40
  Cross-linker _____ 2 to 50
  Peroxide catalyst _____ 0.5 to 10

Preferred formulations for filament reinforced backings are those wherein a modifier is added to the base polymer in the range of about 5 to 30 parts. These adhesives are firmer and/or tackier and thus suitable for coating on filament reinforced polyvinyl acetate backings; illustrative examples are found in the specific formulations following:

Formula 1

Copolymer of vinyl acetate and n-butyl acrylate (base polymer) _____ 90
Polyvinyl acetate resin (modifier) _____ 10
Unsaturated polypropylene glycol-fumarate polyester (cross-linker) _____ 7.5
Benzoyl peroxide (catalyst) _____ 2.0

Formula 2

Copolymer of vinyl acetate and 2-ethyl hexyl acrylate (base polymer) _____ 75
Polyethyl acrylate (modifier) _____ 25
Unsaturated polypropylene glycol-fumarate polyester (cross-linker) _____ 7.5
Benzoyl peroxide (catalyst) _____ 2.0

These adhesives are made by blending the base resin and the modifier as 40% solids in 1:1 ethyl acetate and toluene, with toluene dissolved cross-linking agent (50% solution) and peroxide (13% solution) to provide a 39% solids adhesive preparation suitable for coating. These formulations have been found to provide excellent adhesives on cellulose acetate backings reinforced with longitudinal continuous glass filaments.

The following formulations are examples of adhesives made from acrylic base polymers which have been successfully incorporated into high performance tape constructions.

Formula 3

96.5:4.5 (by weight) copolymer of isooctylacrylate and acrylic acid (base polymer) _____ 100
Unsaturated polypropylene glycol-fumarate polyester (cross-linker) _____ 10
Benzoyl peroxide (catalyst) _____ 0.5

Formula 4

25:75 (weight) fusel oil acrylate and methylamyl acrylate copolymer (base polymer) _____ 100
Unsaturated polypropylene glycol-fumarate polyester (cross-linker) _____ 10
Benzoyl peroxide (catalyst) _____ 0.5

The following formulations are representative of acrylate modified polyvinyl acetate base polymers that have been successfully incorporated into tape constructions in accordance with this invention.

Formula 5

60:40 (approx.) copolymer of vinyl acetate and 2-ethyl hexyl acrylate (base polymer) _____ 50
96.5:4.5 copolymer of isooctyl acrylate and acrylic acid (cross-linker) _____ 50
50:50 mixture of benzoyl peroxide and tricresyl phosphate (catalyst) _____ 1.6

Formula 6

Base polymer of Formula 5 _____ 100
Cross-linker of Formula 2 _____ 10
Catalyst of Formula 5 _____ 1.6

Formula 7

Base polymer of Formula 5 _____ 100
Butanediol - 1,3 - dimethyl methacrylate (cross-linker) _____ 10
Catalyst of Formula 5 _____ 1.6

As noted hereinbefore, to provide an effective, storage stable, contact adherent, roll tape construction the adhesive resulting from the mixture of the components noted in the foregoing should have an adhesion value greater than 20 ounces per inch and a shear strength value of at least two minutes.

"Adhesion value" as used herein is the amount of adhesion in ounces per inch of tape width as measured by ASTM procedure No. D1000. This procedure consists of adhering a one inch wide strip of tape to a number 4 finish stainless steel plate and thereafter stripping the tape at a 180 degree angle from the plate at a rate of 12 inches per minute and measuring the stripping force required. In initially adhering the tape to the plate, adherence is obtained by hand rolling with a 4½ lb. hand roller.

"Shear strength value" as used herein is the time in minutes it take two ½ inch wide strips of adhesive tape overlapped ½ inch in tight adhesive-to-adhesive contact to separate under the conditions following.

The free end of one of the overlapped tape strips is clamped in a jaw and the strips vertically suspended from the jaw. A 1000 gram weight is attached to the free end of the other strip and the time for the adhesive overlap to fail in shear measured.

Figure 2:
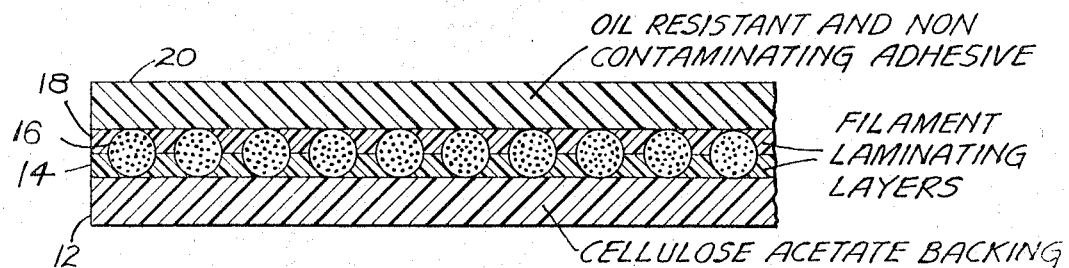

A preferred high strength filament reinforced transformer tape is that shown in the accompanying drawing wherein in FIGURE 1 there is illustrated a roll of tape designated in its entirety by the numeral 10; an enlarged cross sectional view through the tape strip is illustrated in FIGURE 2.

In the cross sectional view of FIGURE 2 the tape is seen to comprise a backing 12 of cellulose acetate or the like coated with a first layer of an adhesive 14, of the nature of Formula 1 or Formula 2 in which adhesive are embedded glass yarns 16 which are then overcoated with a second adhesive coating 18, after which the tape is completed by the application of the third and final adhesive coating 20.

Specific examples of tapes made in accordance with this invention are set forth hereinafter.

EXAMPLE 1

A transformer wrapping tape was made by coating a 1½ mil cellulose acetate film with the adhesive of Formula 1 to a coating weight of 7 grains per 24 square inches. The coated backing was then dried in an oven at 150–200° F. to remove the solvent without imparting any degree of cure to the adhesive. Glass fiber yarn of 45 ends per inch of 15,000 yards per lb. single strand (45 e.p.i. 150–1/0) fiberglass yarn, was then laminated on the dried adhesive coating. Next, the final adhesive coating was coated over the fiberglass yarn to a coating weight of 26 grains per 24 square inches of surface (2.5 mils thick) and the resulting completed tape again dried for approximately ½ an hour in a 200° F. oven to remove the solvent while leaving the adhesive in an essentially uncured state.

A second tape construction was made similar to the first utilizing Formula 2 as the tape adhesive. This second tape construction again utilized a 1½ mil cellulose acetate film base. This base was coated with an adhesive of the formulation following:

| | Parts |
|---|---|
| Vinyl acetate-2-ethyl hexyl acrylate copolymer solids | 100 |
| Propylene glycol-fumarate polyester (as 50% solids in toluene) | 10 |
| 2,4-dichlorobenzoyl peroxide | 2 |

This adhesive was fully cured in a 220° F. oven and the glass yarn was then laminated to this cured adhesive. Thereafter, a seal coat of the same adhesive was applied to the galss yarn and the adhesive again cured in a 220° F. oven. That the adhesive was totally cured was established by immersing the tape in acetone; under this immersion the acetate film backing dissolved completely, but the cured adhesive was sufficiently cross-linked so that the glass yarns remained together. Then, the Formula 2 adhesive was coated over the cured adhesive layers and the tape dried at about 20° F. to remove any remaining solvent while leaving the final adhesive in an uncured state.

Both of these filament tapes, when applied to a kraft paper, and thereafter cured with heat, exhibited excellent retention of bond strength to the paper after immersion in a hydrocarbon transformer oil at 100° C. for 48 hours. Nor was any contamination of the transformer oil by the adhesive found.

These tapes display an adhesion value of about 48 ozs. per inch and a shear strength value of about 4 minutes.

Prior to formation of the tape, the exposed surface of the cellulose acetate was treated with an acrylate backsize to facilitate release of the adhesive upon unwinding of the tape without transfer to the back side of the tape.

EXAMPLE 2

A 1 mil oriented polyester film of polyethylene terephthalate was coated on the backside thereof with backsize composed of the reaction product of octydecyl isocyanate and polyvinyl alcohol, and was coated on the other side to a coating weight of about 8 grains/24 sq. inch (1.2 mil), with an oil resistant adhesive of the formulation following:

| | Pts. by Wt. |
|---|---|
| Vinyl acetate-acrylate copolymer as 40% solution in toluene-ethyl acetate solvent | 100 |
| Unsaturated polypropylene-fumarate polyester | 10 |
| 50:50 paste of benzoyl peroxide and tricresyl phosphate | 1.6 |

This adhesive solution was coated on the untreated surface of the polyester backing and the solvent dried from the adhesive in a 150° oven in such manner that the tape adhesive remained substantially uncured.

The tape so formed was found to have a shear strength value of considerably less than 2 minutes and to be subject to slippage upon wrapping.

However, when these tapes were provided with only a slight cure such that the shear strength value exceeded about 20 minutes it was found that the tapes would stick well initially without undue slippage and would maintain their adherence when subjected to hot oil after thermosetting. In all instances the adhesion values of the tapes were considerably above 20 ozs. per inch.

With respect to the oil used to test adherence, a normal aliphatic hydrocarbon transformer oil was generally used. Other tests were run in chlorinated bi-phenyl oil and phosphate ester based oils used as hydraulic fluids. Contamination was not found in any of the oils; however, adherence was found to be best in the aliphatic oils and slightly less in the other oils.

As will be noted from the foregoing, numerous formulation variations in the adhesives and in the combination of the adhesives and backings can be made within the ambit of this invention in the making of oil resistant and contamination free tapes. For example, pigments, stabilizers, anti-oxidants and other commonly used additives can be used, as can a variety of tape backings, backsizes, all of which are within the ambit of this invention.

We claim:

1. An oil resistant, non-contaminating contact adherent adhesive tape wound in roll form and having a back surface only lightly adherent to and readily separable from the tape adhesive upon rapid unwind of the tape from roll form, said tape comprising a backing having a thermosetting adhesive thereon having prior to thermosetting a shear strength value of at least about 2 minutes and an adhesion value of at least about 20 ozs. per inch, said adhesive consisting essentially of (1) 50 to 100 parts by weight of a normally thermoplastic base polymer selected from the group consisting of copolymers of alkyl acrylates with one another and with acrylic acid, and alkyl acrylate-vinyl acetate copolymers, (2) from 2 to about 50 parts of an organic polymeric cross-linker for cross linking with (1), and (3) from about 0.5 to about 10 parts of a heat-activated cross-linking catalyst for cross-linking (1) with (2) upon heat activation to thermoset said adhesive.

2. An oil-resistant, non-contaminating contact adherent adhesive tape wound in roll form and having a backside only lightly adherent to and readily separable from the tape adhesive on rapid unwind of the tape from roll form, said tape comprising a backing having a thermosetting adhesive on the front side thereof, said tape adhesive consisting essentially of (1) 100 parts by weight of a normally thermoplastic vinyl acetate-alkyl acrylate copolymer containing from about 10 to about 40% acrylate by weight, (2) from about 2 to about 50 parts of an organic polymeric cross-linker for cross-linking with (1), and (3) from about ½ to 5 parts of an organic peroxide catalyst for cross-linking (2) with (1) to thermoset said adhesive, said tape adhesive having prior to thermosetting a shear strength value of greater than 2 minutes and an adhesion value of at least about 20 ounces per inch of tape width.

3. An oil resistant, non-contaminating contact adherent adhesive tape wound in roll form and having a back side only lightly adherent to and readily separable from the tape adhesive on rapid unwind of the tape from roll form, said tape having a backing with a thermosetting adhesive thereon having prior to thermosetting a shear strength value of at least about 2 minutes and an adhesion value greater than about 20 ounces per inch, said adhesive consisting essentially of (1) 50 to 100 parts by weight of a thermoplastic base polymer selected from the group consisting of copolymers of alkyl acrylate with one another and with acrylic acid, (2) from 2 to about 50 parts of an organic polymeric cross-linker of an unsaturated organic polyester for cross-linking with (1), and (3) from about 0.5 to 5 parts of an organic peroxide catalyst for cross-linking (1) with (2) to thermoset said adhesive.

4. An oil resistant, non-contaminating contact adherent adhesive tape wound in roll form and having a back surface only lightly adherent to and readily separable from the tape adhesive upon rapid unwind of the tape from roll form, said tape comprising a backing having prior to thermosetting a thermosetting adhesive thereon having a shear strength value of at least about 20 minutes and an adhesion value of at least about 20 ozs. per inch, said backing comprising an oriented polyester film, said adhesive consisting essentially of (1) 50 to 100 parts by weight of a normally thermoplastic base polymer selected from the group consisting of copolymers of alkyl acrylates with one another and with acrylic acid, and alkyl acrylate-vinyl acetate copolymers, (2) from 2 to about 50 parts of an organic polymeric cross-linker for cross-linking with (1), and (3) from about 0.5 to about 10 parts of a heat-activated cross-linking catalyst for cross-linking (1) with (2) to thermoset said adhesive.

5. The tape of claim 4 wherein said cross-linker is a highly unsaturated organic polyester.

6. An oil-resistant, non-contaminating contact adherent adhesive tape wound in roll form and having a backside only lightly adherent to and readily separable from the tape adhesive on rapid unwind of the tape from roll form, said tape comprising a backing having a thermosetting adhesive on the front side thereof, said tape backing comprising a self-sustaining polymer film having laminated thereto continuous reinforcing filaments bonded thereto with a laminating adhesive compatible with said thermosetting adhesive, said tape adhesive consisting essentially of (1) 50 to 100 parts by weight of a normally thermoplastic vinyl acetate-alkyl acrylate copolymer containing from about 10 to about 40% acrylate by weight, (2) from about 2 to about 50 parts of an organic polymeric cross-linker for cross-linking with (1), and (3) from about ½ to 5 parts of an organic peroxide catalyst for cross-linking (1) with (2) to thermoset, said tape adhesive having said adhesive prior to thermosetting a shear strength value of greater than 2 minutes and an adhesion value of at least about 20 ounces per inch of tape width.

7. The tape of claim 6 wherein said laminating adhesive consists essentially of (1), (2), and (3) of said thermosetting adhesive.

8. An oil resistant, non-contaminating contact adherent adhesive tape wound in roll form and having a back surface only lightly adherent to and readily separable from the tape adhesive upon rapid unwind of the tape from roll form, said tape comprising a backing having a thermosetting adhesive thereon having, prior to thermosetting, a shear strength value of at least about 2 minutes and an adhesion value of at least about 20 ozs. per inch, said adhesive consisting essentially of (1) 100 parts by weight of a normally thermoplastic base polymer selected from the group consisting of alkyl acrylate-vinyl acetate copolymers containing from about 10 to 40% acrylate by weight, (2) from 2 to about 50 parts of an unsaturated polyester as an organic cross-linker for cross-linking with (1), and (3) from about 0.5 to about 10 parts of a heat-activated cross-linking peroxide catalyst to cross-link (1) and (2) to thermoset said adhesive upon heat activation.

9. An oil-resistant, non-contaminating contact adherent adhesive tape wound in roll form and having a back side only lightly adherent to and readily separable from the tape adhesive upon rapid unwind of the tape form roll form, said tape comprising a backing having a thermosetting adhesive thereon having, prior to thermosetting, a shear strength value of at least about 2 minutes and an adhesion value of at least about 20 ounces per inch and consisting essentially of (1) 100 parts by weight of a normally thermoplastic vinyl acetate-alkyl acrylate copolymer containing from about 10 to about 40% acrylate by weight and, (2) about 2 to about 30 parts of an organic cross-linker selected from the group consisting of unsaturated polyesters and acrylates having free radical activated cross-linking sites for cross-linking with (1), and (3) from about one-half to about 5 parts of an organic peroxide catalyst for cross-linking (1) with (2) to thermoset said adhesive.

References Cited by the Examiner

UNITED STATES PATENTS

| 2,544,692 | 3/1951 | Kugler et al. | 117—122 |
| 2,575,585 | 11/1951 | Cox et al. | 117—122 |
| 2,750,030 | 6/1956 | Tierney | 161—144 |
| 3,073,734 | 1/1963 | Bemmels | 161—143 |
| 3,179,552 | 4/1965 | Hauser et al. | 117—122 |
| 3,189,581 | 6/1965 | Hart et al. | 117—145 |
| 3,222,419 | 12/1965 | Jubilee et al. | 117—122 |
| 3,222,421 | 12/1965 | Lundberg | 260—862 |

WILLIAM D. MARTIN, *Primary Examiner.*

W. D. HERRICK, *Assistant Examiner.*